US006653568B1

(12) United States Patent
Davis

(10) Patent No.: US 6,653,568 B1
(45) Date of Patent: Nov. 25, 2003

(54) FLEXIBLE HARNESS WRAP

(75) Inventor: David R. Davis, Richton Park, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 10/243,821

(22) Filed: Sep. 13, 2002

(51) Int. Cl.[7] ................................................ H02G 3/04
(52) U.S. Cl. ..................... 174/68.3; 174/68.1; 174/135; 248/68.1; 439/207
(58) Field of Search ............................... 174/68.3, 68.1, 174/48, 135, 70 C, 21 R, 24, 72 C; 248/68.1; 439/207

(56) References Cited

U.S. PATENT DOCUMENTS

| 2,216,765 A | * | 10/1940 | Clayton ....................... 315/312 |
| 3,080,892 A | * | 3/1963 | Plummer ....................... 138/128 |
| 3,637,957 A | | 1/1972 | Janzow et al. |
| 3,958,751 A | | 5/1976 | Bruno |
| 3,989,885 A | | 11/1976 | Penczynski et al. |
| 4,424,627 A | | 1/1984 | Tarbox |
| 5,331,115 A | | 7/1994 | Ysbrand |
| 5,814,767 A | | 9/1998 | Katz |
| 5,849,379 A | | 12/1998 | Gladfelter et al. |
| 5,912,437 A | | 6/1999 | Mazaris |
| 6,022,231 A | * | 2/2000 | Williams et al. ............. 439/207 |
| 6,034,329 A | | 3/2000 | Kawamura |
| 6,078,009 A | | 6/2000 | Kawamura |
| 6,156,974 A | * | 12/2000 | Blase ........................ 174/68.3 |
| 6,332,479 B1 | * | 12/2001 | Ko ............................. 174/68.3 |
| 6,362,420 B1 | * | 3/2002 | Bacouelle et al. ............ 174/48 |
| 6,423,898 B1 | * | 7/2002 | Croker ........................ 174/50 |

OTHER PUBLICATIONS

Richco, Inc. Press Release, 1 page, dated Apr. 24, 2000.
Richco, Inc. Cable & Fiber Management Catalog, p. 135, date unknown.
Hellermann Tyton Cable Protection Systems Catalog, p. 20, date unkown.
Hellermann Tyton Press Release, 1 page, dated Jun. 5, 2001.

* cited by examiner

*Primary Examiner*—Dhiru R Patel
(74) *Attorney, Agent, or Firm*—Robert A. McCann; Jay A. Saltzman; Christopher S. Clancy

(57) ABSTRACT

A flexible harness wrap for protecting bundles or cables laid therein is disclosed. The harness wrap includes a first row having a first plurality of slots and a second row having a second plurality of slots. A method of making a flexible harness wrap for protecting bundles or cables laid therein is also disclosed.

14 Claims, 7 Drawing Sheets

FLEXIBLE HARNESS WRAP

BACKGROUND OF THE INVENTION

The present invention is directed to a harness wrap, and more particularly, to a flexible harness wrap for protecting bundles or cables laid therein.

Flexible harness wraps for protecting bundles or cables laid therein have been used in the telecommunications industry. However, none of the prior harness wraps provide a slot design that maximizes the bending ability of the harness wrap, while maximizing bundle coverage and protection when the harness wrap is flexed. For example, Richco's slit harness wrap utilizes a slot design that may expose bundles or cables laid therein when the harness wrap is flexed. Moreover, Hellermann Tyton's Helawrap™ harness wrap utilizes a slot design that may expose bundles or cables laid therein when the harness wrap is flexed.

It would be desirable to provide a flexible harness wrap having a slot design that maximizes the bending ability of the harness wrap, while maximizing bundle coverage and protection when the harness wrap is flexed.

SUMMARY OF THE INVENTION

A flexible harness wrap for protecting bundles or cables laid therein is disclosed. The harness wrap includes a first row having a first plurality of slots and a second row having a second plurality of slots.

Preferably, the second plurality of slots is longitudinally staggered relative to the first plurality of slots.

Preferably, the first row has at least one slot more than the second row.

Preferably, the first row has three slots and the second row has two slots.

Preferably, the second row has two notches.

Preferably, at least a portion of a slot along the second row overlies at least a portion of a slot along the first row.

DETAILED DESCRIPTION OF PREFERRED EMBODIMENTS

The illustrated embodiments of the invention are directed to a flexible harness wrap for protecting bundles or cables laid therein.

Figure 1:
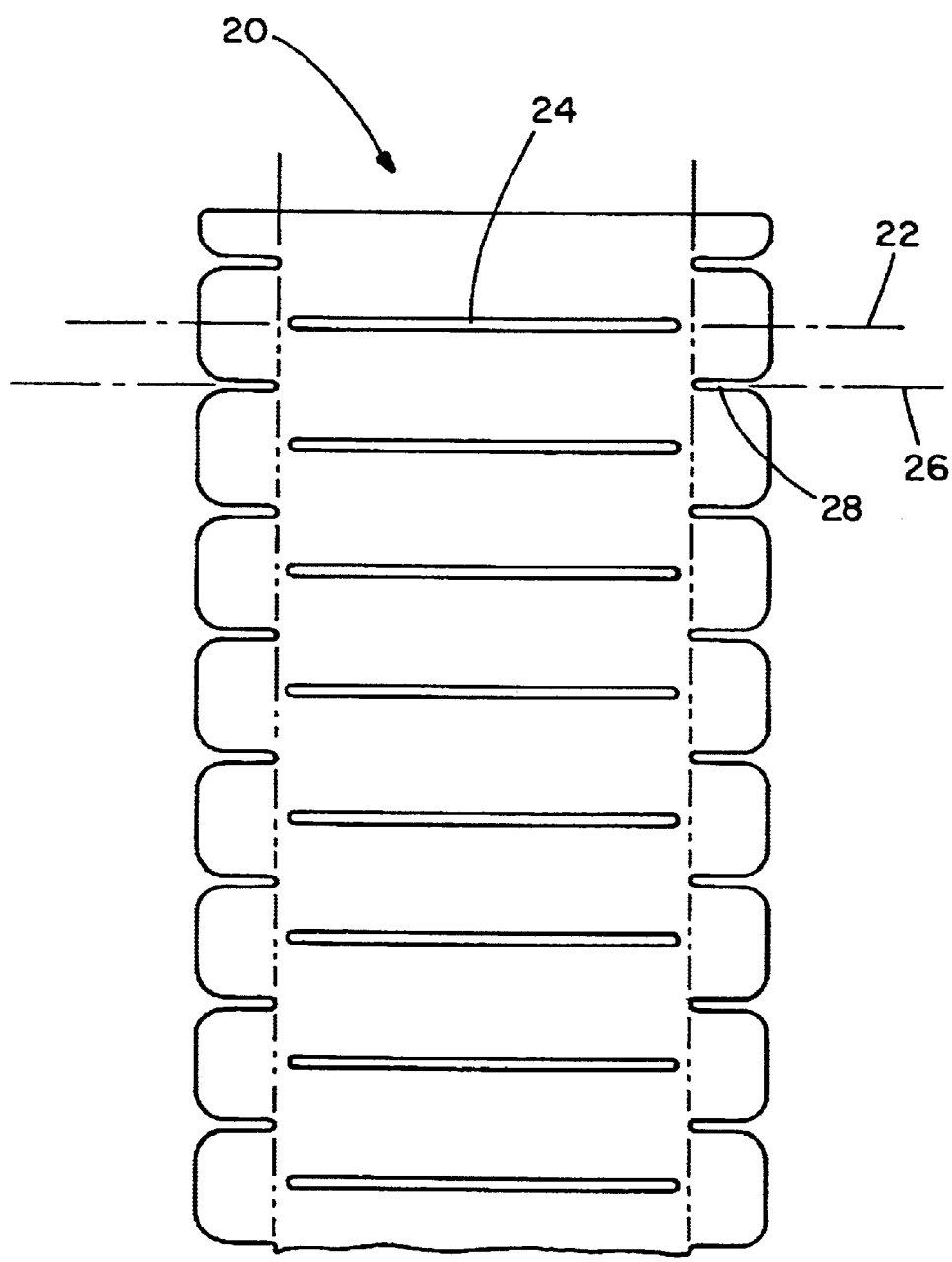
FIG. 1 is a front view of a flat pattern of a harness wrap according to the prior art.

FIG. 1 shows a flat pattern of a flexible harness wrap according to the prior art. The harness wrap 20 includes a first row 22 having a slot 24 and a second row 26 having two notches, such as notch 28. The second row 26 does not have any slots. Moreover, as shown by the dashed vertical line in FIG. 1, the slot 24 does not overlie the notch 28.

Figure 2:
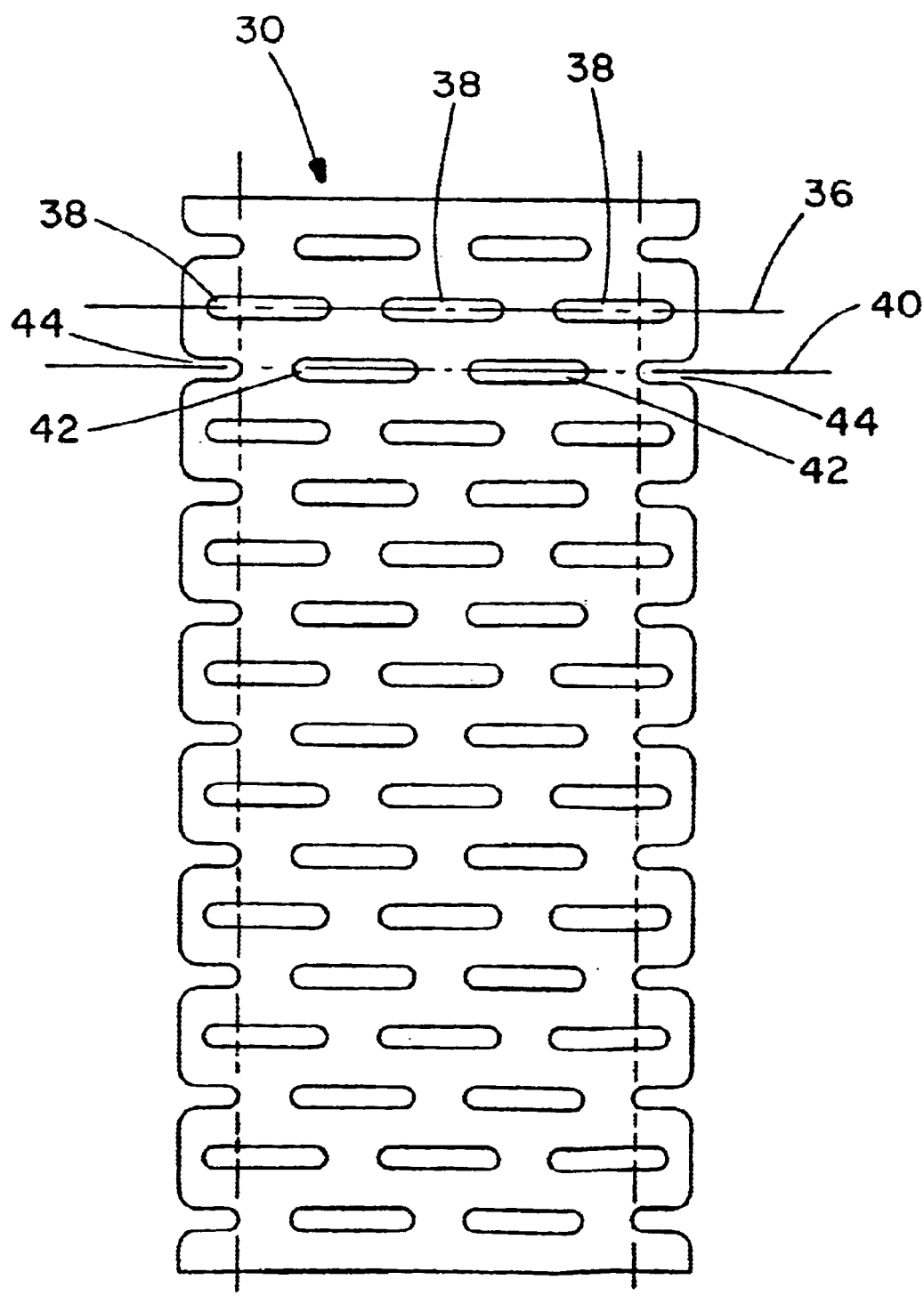
FIG. 2 is a front view of a flat pattern of a harness wrap according to the present invention.
Figure 8:
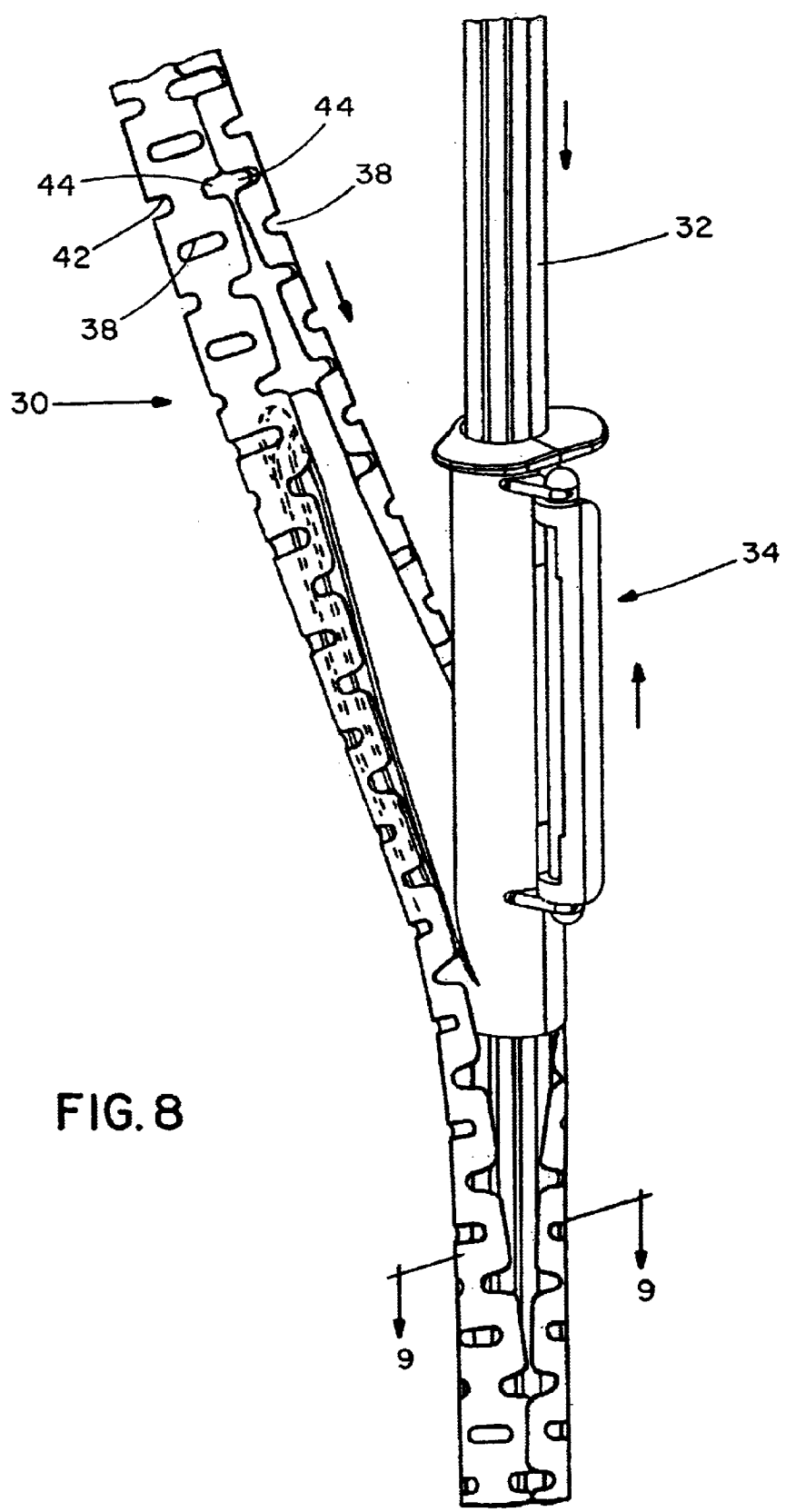
FIG. 8 is a perspective view of the harness wrap of FIG. 2 being applied to bundled cables using a harness wrap application tool.

FIG. 2 shows a flat pattern of a flexible harness wrap 30 for protecting bundles or cables 32 laid therein. Preferably, the harness wrap 30 is formed from a suitable plastic material. As shown in FIG. 8, a harness wrap application tool 34, such as the harness wrap application tool disclosed in co-pending U.S. Ser. No. 10/243,510, the disclosure of which is incorporated by reference in its entirety, is utilized to insert wires or cables 32 in the harness wrap 30.

Figure 3:
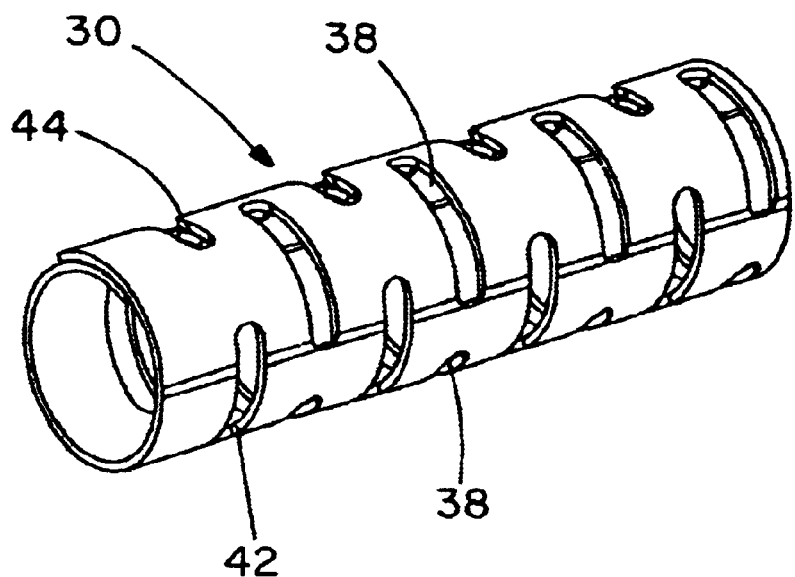
FIG. 3 is a front perspective view of the harness wrap of FIG. 2.
Figure 4:
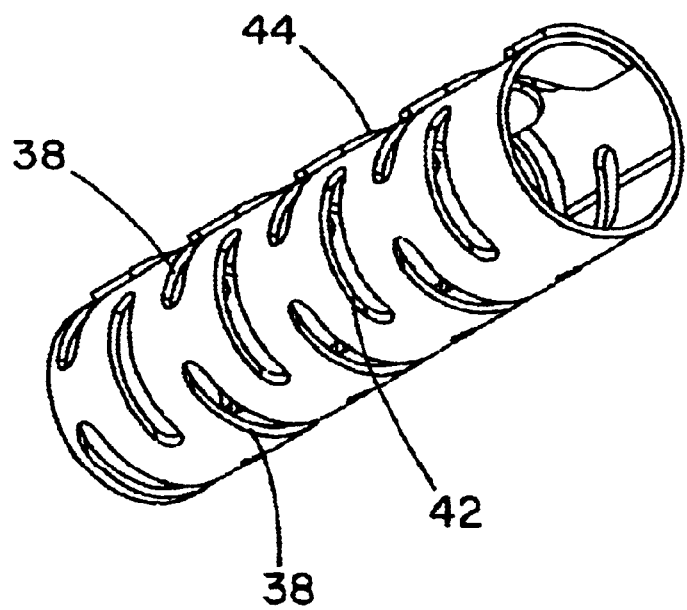
FIG. 4 is a rear perspective view of the harness wrap of FIG. 2.
Figure 5:
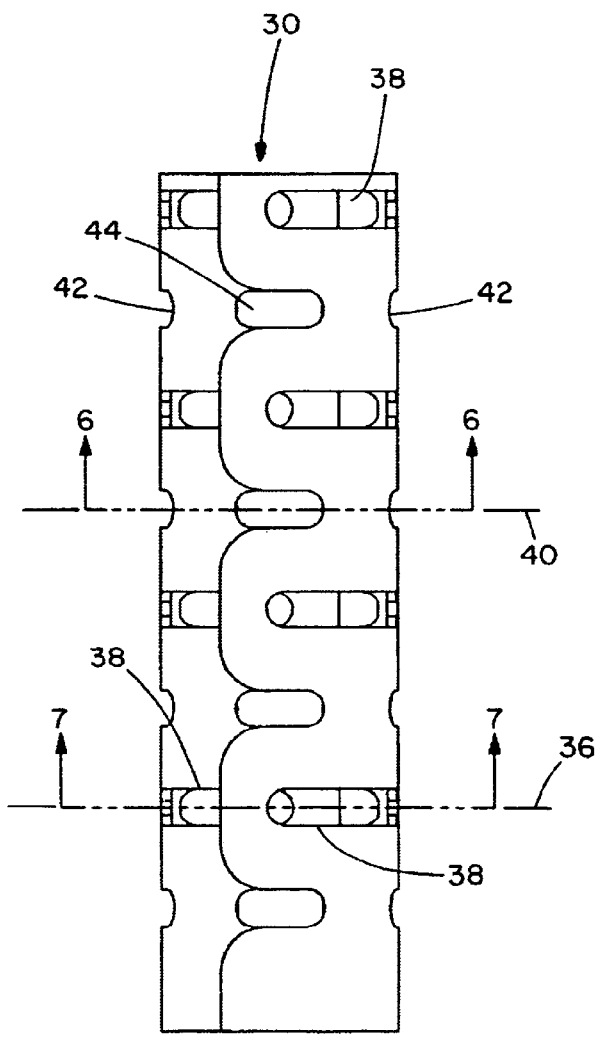
FIG. 5 is a front view of the harness wrap of FIG. 2.

As shown in FIGS. 2–4, the harness wrap 30 includes a first row 36 having a plurality of slots, such as slot 38, and a second row 40 having a plurality of slots, such as slot 42. As shown by the dashed vertical line in FIG. 2, at least a portion of slot 42 overlies at least a portion of slot 38. Moreover, slots 42 are longitudinally staggered relative to slots 38. As best seen in FIG. 2, harness wrap 30 utilizes horizontally alternating slot arrangement The first row 36 bas three slots 38 and the second row 40 has two slots 42. However, it is likewise contemplated that the first and second rows may have any number of slots. Preferably, the first row 36 has one slot more than the second row 40. Moreover, as best seen in FIG. 5, the second row 40 has two notches, such as notch 44 which overlap to form a slot when the harness wrap 30 is rolled from a flat pattern, as shown in FIG. 2 into the flexible harness wrap 30 shown in FIGS. 3–12.

Figure 6:
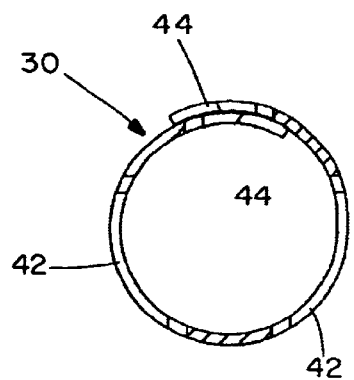
FIG. 6 is a cross-sectional view taken along lines 6—6 of FIG. 5.
Figure 7:
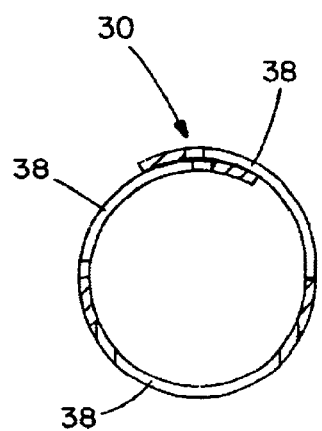
FIG. 7 is a cross-sectional view taken along lines 7—7 of FIG. 5.
Figure 9:
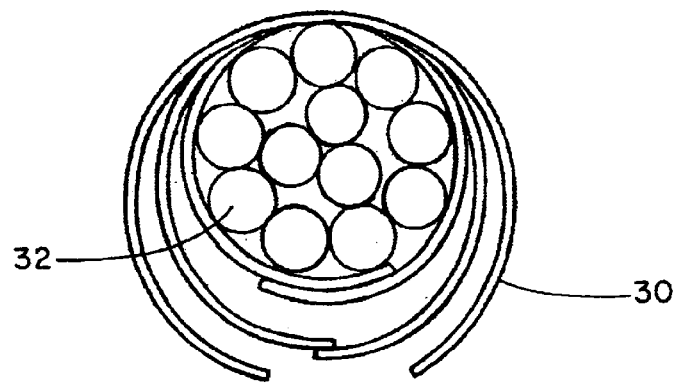
FIG. 9 is a cross-sectional view taken along lines 9—9 of FIG. 8.

FIG. 6 shows a cross-sectional view of the harness wrap 30 taken along the second row 40, showing slots 38 along the first row 36. FIG. 7 shows a cross-sectional view of the harness wrap 30 taken along the first row 36, showing slots 42 along the second row 40. The overlap shown in FIGS. 6 and 7 allows for increased variation in the bundle size diameter of the harness wrap 30. Preferably, the overlap is between 45° and 90° to prevent the cables 32 from inadvertently falling out of the harness wrap 30 when flexed. FIG. 8 shows the harness wrap 30 being applied onto bundles or cables 32 utilizing the harness wrap application tool 34. As shown in FIG. 9, as the harness wrap 30 encompasses bundles or cables 32, the harness wrap 30 overlaps to contain the bundles or cables 32 therein.

Figure 10:
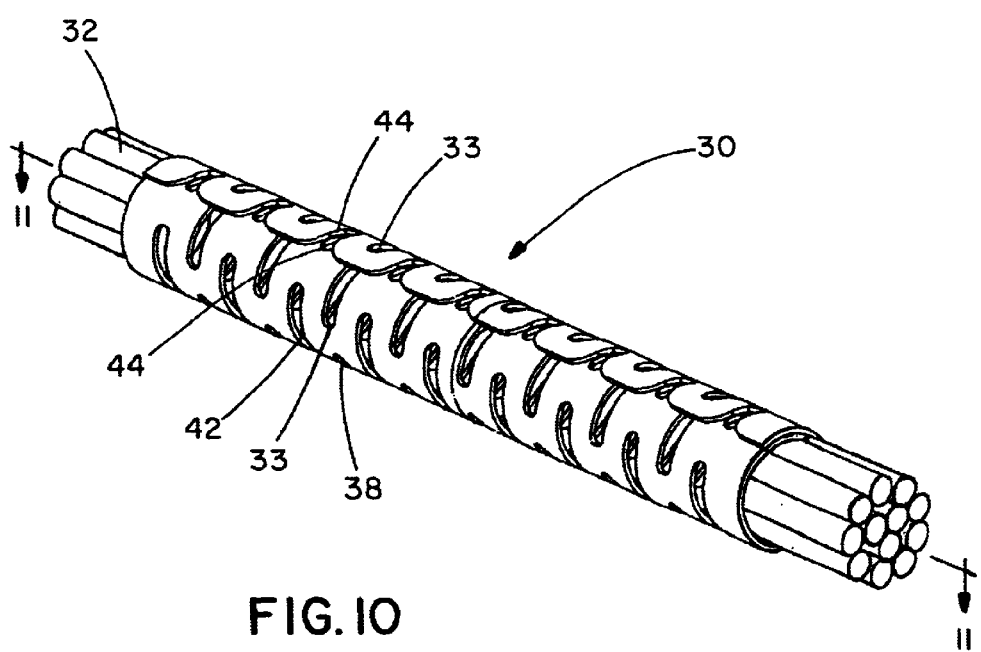
FIG. 10 is a perspective view of the harness wrap of FIG. 2 after the bundled cables are laid therein.
Figure 11:
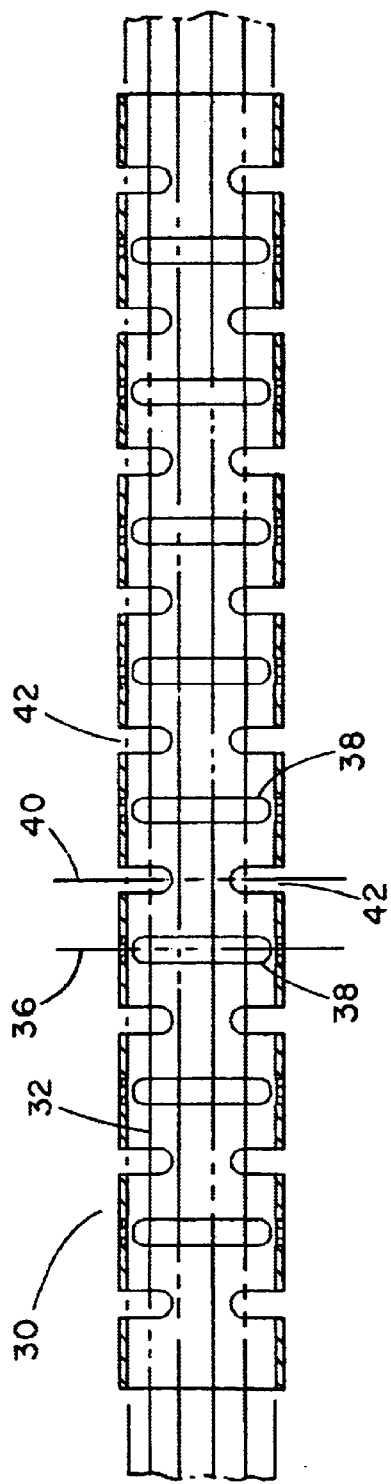
FIG. 11 is a cross-sectional view taken along lines 11—11 of FIG. 10.
Figure 12:
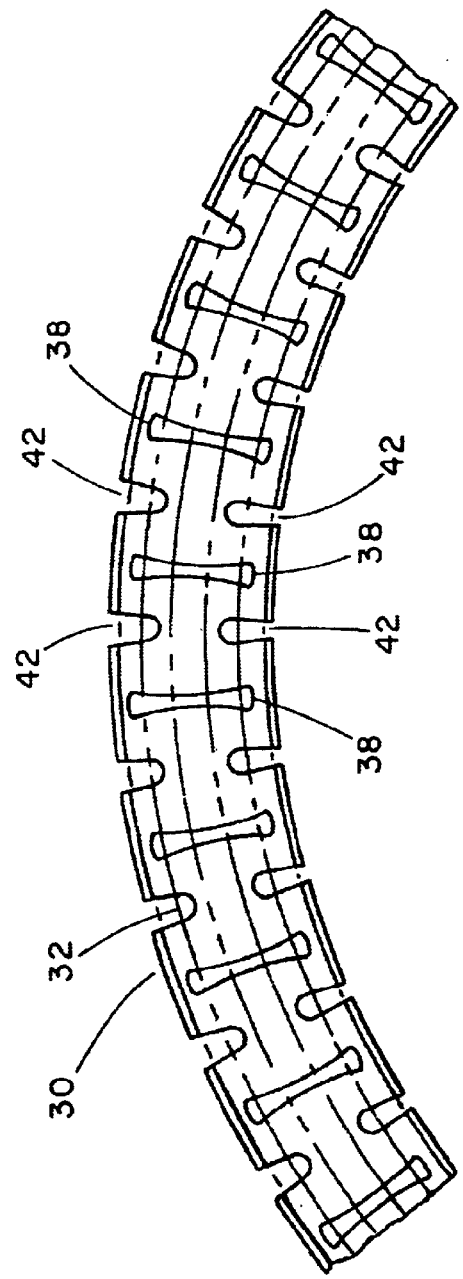
FIG. 12 is a cross-sectional view of the harness wrap of FIG. 10 in a flexed position.

As shown in FIGS. 10–12, the slot design of the present invention maximizes the bending ability of the harness wrap 30, while maximizing bundle coverage and protection of the bundles or cables 32 laid therein when the harness wrap 30 is flexed. The slot design of the harness wrap 30 may be varied to adjust the minimum bend radius of cables 32 laid therein. As best seen in FIG. 12, as the harness wrap 30 is flexed, some of the slots 38 and 42 decrease in overall size to maximize bundle coverage and protection of the cables 32 laid therein. In prior harness wraps, such as harness wrap 20 shown in FIG. 1, slot 24 increases in overall size to expose the bundles or cables laid therein when the harness wrap 20 is flexed.

The disclosed invention provides a flexible harness wrap for protecting bundles or cables laid therein. The harness wrap includes a first row having a first plurality of slots and a second row having a second plurality of slots. It should be noted that the above-described and illustrated embodiments and preferred embodiments of the invention are not an exhaustive listing of the forms such a flexible harness wrap in accordance with the invention might take; rather, they serve as exemplary and illustrative of embodiments of the invention as presently understood. By way of example, and without limitation, a flexible harness wrap having more than two row patterns, each having a plurality of slots, is contemplated to be within the scope of the invention. Many other forms of the invention are believed to exist.

What is claimed is:

1. A flexible harness wrap for protecting bundles or cables laid therein, the harness wrap comprising:

a first row having a first plurality of slots; and a second row having a second plurality of slots, wherein the first plurality of slots and the second plurality of slots of the flexible harness wrap decrease overall size, as the flexible harness wrap is being flexed to maximize bundle coverage and protection of the cables laid therein.

2. The harness wrap of claim 1 wherein the second plurality of slots is longitudinally staggered relative to the first plurality of slots.

3. The harness wrap of claim 2 wherein the first row has at least one slot more than the second row.

4. The harness wrap of claim 1 wherein the first row has at least one slot more than the second row.

5. The harness wrap of claim 1 wherein the first row has three slots.

6. The harness wrap of claim 1 wherein the second row has two slots.

7. The harness wrap of claim 1 wherein the second row has two notches.

8. A flexible harness wrap for protecting bundles or cables laid therein, the harness wrap comprising:

a first row having at least a first slot; and a second row having at least a second slot, wherein at least a portion of the second slot overlies at least a portion of the first slot, wherein the first slot and the second slot of the flexible harness wrap decrease in overall size as the flexible harness wrap is being flexed to maximize bundle coverage and protection of the cables laid therein.

9. The harness wrap of claim 8 wherein the first row has at least one slot more than the second row.

10. The harness wrap of claim 8 wherein the first row has three slots.

11. The harness wrap of claim 8 wherein the second row has two slots.

12. The harness wrap of claim 8 wherein the second row has two notches.

13. A method of making a flexible harness wrap for protecting bundles or cables laid therein, the method comprising the steps of:

forming a flat pattern comprising a first row having a first plurality of slots and a second row having a second plurality of slots, wherein the first plurality of slots and the second plurality of slots of the flexible harness wrap decrease in overall size as the flexible harness wrap is being flexed to maximize bundle coverage, and protection of the cables laid therein; and rolling the flat pattern into a flexible harness wrap.

14. A method of making a flexible harness wrap for protecting bundles or cables laid therein, the method comprising the steps of:

forming a flat pattern comprising a first row having at least a first slot and a second row having at least a second slot, wherein at least a portion of the second slot overlies at least a portion of the first slot, the first slot and the second slot of the flexible harness wrap decrease in oversll size as the flexible harness wrap is being flexed to maximize bundle coverage and protection of the cables laid therein; and rolling the flat pattern into a flexible harness wrap.

* * * * *

UNITED STATES PATENT AND TRADEMARK OFFICE
CERTIFICATE OF CORRECTION

PATENT NO.    : 6,653,568 B1
DATED         : November 25, 2003
INVENTOR(S)   : David R. Davis It is certified that error appears in the above-identified patent and that said Letters Patent is hereby corrected as shown below:

Column 2,
Line 28, "a" should be inserted at the beginning of the line, and the period is missing at the end of the sentence after "arrangement".

Column 3,
Line 18, "in" should be inserted after "decrease".

Signed and Sealed this

Tenth Day of May, 2005

JON W. DUDAS
*Director of the United States Patent and Trademark Office*